United States Patent [19]
Rom

[11] Patent Number: 5,515,509
[45] Date of Patent: May 7, 1996

[54] METHOD AND APPARATUS FOR IMPLEMENTING SELF-ORGANIZATION IN A WIRELESS LOCAL AREA NETWORK

[75] Inventor: Raphael Rom, Palo Alto, Calif.

[73] Assignee: Sun Microsystems, Inc., Mountain View, Calif.

[21] Appl. No.: 389,735

[22] Filed: Feb. 15, 1995

Related U.S. Application Data

[63] Continuation of Ser. No. 915,433, Jul. 17, 1992, abandoned.

[51] Int. Cl.$^6$ .................................................. G06F 13/00
[52] U.S. Cl. ........................... 395/200.1; 364/DIG. 1; 364/DIG. 2; 364/242.94; 364/242.95; 364/935; 364/935.1
[58] Field of Search .............. 364/DIG. 1 MS File, 364/DIG. 2 MS File; 370/60.1, 85.2, 110.1; 379/57; 455/33, 39; 395/200.1, 200.2, 200.6, 200.11, 200.12, 200.13, 200.14, 200.15

[56] References Cited

U.S. PATENT DOCUMENTS

| | | | |
|---|---|---|---|
| 4,718,081 | 1/1988 | Brenig | 379/60 |
| 4,765,753 | 8/1988 | Schmidt | 379/60 |
| 4,783,780 | 11/1988 | Alexis | 455/33.3 |
| 4,797,947 | 1/1989 | Labedz | 455/33 |
| 4,881,271 | 11/1989 | Yamauchi et al. | 455/56 |
| 4,907,290 | 3/1990 | Crompton | 455/56 |
| 4,958,341 | 9/1990 | Hemmandy et al. | 370/60.1 |
| 5,042,082 | 8/1991 | Dahlin | 379/60 |
| 5,068,916 | 11/1991 | Harrison et al. | 455/39 |
| 5,119,397 | 6/1992 | Dahlin et al. | 375/5 |
| 5,179,559 | 1/1993 | Crisler et al. | 370/95.1 |
| 5,181,200 | 1/1993 | Harrison | 370/85.1 |
| 5,199,031 | 3/1993 | Dahlin | 370/110.1 |
| 5,222,249 | 6/1993 | Carney | 455/33.2 |
| 5,321,542 | 6/1994 | Freitas et al. | 359/172 |

FOREIGN PATENT DOCUMENTS

| | | | |
|---|---|---|---|
| 0364638 | 10/1988 | European Pat. Off. | H04L 12/28 |
| 0483544 | 5/1992 | European Pat. Off. | H04Q 7/04 |
| WO91/07020 | 5/1991 | WIPO | 379/60 |

OTHER PUBLICATIONS

11th Annual International Phoenix Conference On Computer And Communications 1 Apr. 1992, Scottsdale, US, pp. 255–259, XP310617.
K. Arai et al 'A Hybrid Indoor Data Network With Radio And Wire Performance Evaluation In A Rayleigh Channel' *the whole document*.

*Primary Examiner*—Robert B. Harrell
*Attorney, Agent, or Firm*—Blakely Sokoloff Taylor & Zafman

[57] ABSTRACT

A method and apparatus for implementing self-organization in a wireless local area network ("LAN"). Each LAN is divided into a plurality of cells. Each cell is occupied by a number of nodes and one or more relay points (RPs) for communicating information within and among cells. Two separate channels are provided. The first channel, the control channel, is common to all RPs and accessible by all nodes and is utilized for communication of control information such as signal strengths of the RPs and the operating parameters of the selected RP. The second channel, the data channel, is utilized for normal communications between the selected RP and the node, and is specific to the RP. To initiate the self-organization process, the node identifies relay points in the LAN by acquiring identification information transmitted by the relay points across a common control channel. The node selects one of the relay points for communication with the node, and issues a message over the control channel requesting that the selected relay point transfer operating parameters from the relay point to the node. In response, the operating parameters are conveyed to the node. The operating parameters of the node are conformed to those of the selected relay point so that the node can communicate in the context of the selected relay point over the data channel unique to the cell, and through the selected relay point to other nodes within the same cell or to the network.

21 Claims, 3 Drawing Sheets

METHOD AND APPARATUS FOR IMPLEMENTING SELF-ORGANIZATION IN A WIRELESS LOCAL AREA NETWORK

This is a continuation of application Ser. No. 07/915,433, filed Jul. 17, 1992, now abandoned.

BACKGROUND OF THE INVENTION

1. Field of the Invention.

The present invention relates to the field of wireless local area networks (LANs) and, more particularly, to a method and apparatus for implementing self-organization in a wireless LAN.

2. Description of the Related Art

Through the merging of computer and communications technology, computer networks have greatly enhanced the computing power available to the individual computer user linked to other computers in a network. Not only do networks provide for the exchange of information between autonomous computers, but they also enable each user or "node" to share resources common to the entire network. Through resource sharing, all application programs, databases and physical equipment in the network may be made available to any node without regard to the physical location of the resource or the user.

As for the linkage between nodes, there are generally two types of network interconnections. The nodes in a wired network communicate with each other by using transmission lines to carry the signals between the nodes. The nodes in a wireless network, on the other hand, communicate with each other using radio signals or other types of wireless links rather than physical interconnections.

One type of wireless network is a wireless local area network (LAN). A LAN is local in the sense that the transceiver nodes are located within a radius of only a few miles of each other. As such, the proximity of the nodes permits the network to operate reliably at low power and at high data rates.

Typically, nodes in a wireless LAN are mobile and transmit information in packets. These nodes, although mobile, may be geographically grouped at any given time into basic service areas (BSAs), otherwise referred to as "cells." The nodes within a cell communicate with each other either directly or through a cell coordinator that relays messages among the nodes of the cell. Note that the coordinator itself may be implemented either within a regular node or in a node that only performs the coordination function.

Communication between nodes in different BSAs is accomplished through an access point (AP), which is responsible for relaying packets into and out of the BSA. To allow for inter-cell communication, each cell must contain at least one AP. The coordinator and the AP are often implemented in the same node. Communication among the APs may take place over the same or different radio channels or via a separate wired network.

During node power-up, the node is assimilated into the network environment using what is known as the network "basic self-organization" ("BSO") capability. During self-organization, each node is associated with a coordinator in a cell (if one exists), and in a multi-cell system, each node is also associated with at least one AP in a cell. For ease of explanation, APs and coordinators will be collectively referred to as "relay points". The choice of which relay point to associate with a node is based on criteria such as the quality of the link between the node and the relay point, and the load carried by the relay point. The self-organization procedure is considered complete when a node has acquired the context parameters that will enable it to effectively communicate within the cell with peer nodes or relay points. For example, the node will need to know the operating frequency of the coordinator before it can begin to communicate with the coordinator.

The need for a self-organization capability depends on the medium access protocol and the BSA architecture used by the network. In a completely uniform and distributed system, a self-organization capability is unnecessary because all nodes operate identically using the same operating parameters. Thus, a node need not acquire context parameters to establish communications with a relay point because the parameter information is fixed in the node since it is the same for all nodes and relay points. For instance, if all nodes and relay points operate at the same frequency, then there is no need for a node to acquire this information during power-up because the node frequency need never be adjusted and the frequency value may be permanently stored in the node. As a practical example, the single-band ALOHA system is uniform and completely distributed, and thus does not require a self-organization capability. On the other hand, when the network is not completely distributed, or if the BSAs utilize different operating parameters, as may be the case if the cells are designed to achieve non-interference, then a separate self-organization process is necessary.

In conventional cellular telephone systems, the association of a mobile unit with a base station is determined by the base stations alone. Because the mobile units do not participate in the BSO process, the cellular phone system requires a considerable amount of cooperation among the base stations to ensure an adequate association. The quality of the association and the efficiency of the process in the cellular telephone system is not as good as that which would be achieved if the mobile unit participated in the self-organization procedure. For example, in a conventional cellular telephone system the base stations communicate with each other to determine which station best receives signals transmitted by the node. However, the radio links are asymmetric, and the signal characteristics transmitted are not necessarily the same as those received. Thus, a base station cannot determine how well a node receives a signal transmitted by the station based upon how well the base station receives a signal from the node. Clearly, optimal association requires the participation of the node in the BSO process.

SUMMARY OF THE INVENTION

The present invention provides a method and apparatus for implementing self-organization in a wireless LAN. Each LAN is divided into a plurality of cells. Each cell is occupied by a number of nodes and one or more relay points (RPs), possibly including a coordinator for communicating information within a cell and one or more access points for communicating information among cells.

Two separate channels are provided. The first channel, the control channel, is common to all RPs and accessible by all nodes and is utilized for communication of control information such as signal strengths of the RPs and the operating parameters of the selected RP. The second channel, the data channel, is utilized for normal communications between the selected RP and the node. This channel is specific to the RP.

To initiate the self-organization process, the node identifies relay points in the LAN by acquiring identification information transmitted by the relay points across the common control channel. The node selects one of the relay points for communication with the node, and issues a message over the control channel requesting that the selected relay point transfer operating parameters from the relay point to the node. In response, the operating or context parameters are conveyed to the node over the control channel. The operating parameters of the node are conformed to those of the selected relay point so that the node can communicate in the context of the selected relay point over the data channel unique to the cell, and through the selected relay point to another node either in the same cell or in a different cell.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

The present invention provides a method and apparatus for a wireless LAN which implements a self-organization process. For purposes of explanation, specific embodiments are set forth to provide a thorough understanding of the present invention. However, it will be apparent to one skilled in the art that the invention may be practiced without these details. In other instances, well known elements, devices and the like are not set forth in detail in order to avoid unnecessarily obscuring the present invention.

The present invention achieves self-organization in a wireless LAN in which the node participates in the process, thus eliminating the need for cooperation among the relay points. In addition, the invention provides a separate control channel from which the node can independently access the information required to establish communications with a relay point within a cell.

Figure 1:
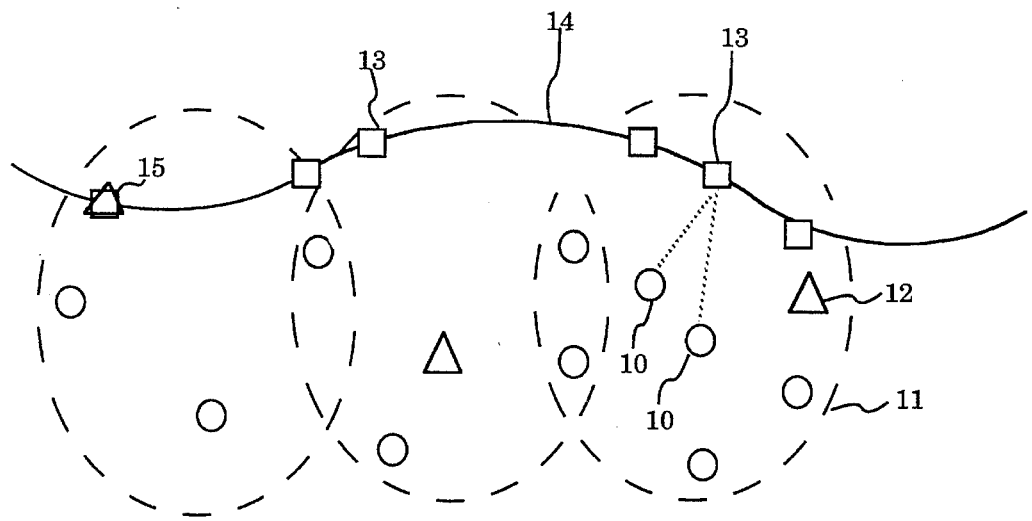
FIG. 1 is an illustration of a typical wireless LAN.

FIG. 1 illustrates a typical wireless LAN. Nodes 10 are organized into geographic regions called "basic service areas" (BSA) or "cells" 11. Note that a node can belong to more than one cell. The nodes within a cell communicate with each other either directly or through a coordinator 12, which relays messages among the nodes of the cell.

A node within one cell cannot communicate directly with a node in another cell. Rather, the message must be relayed through one or more access points (APs) 13, which are linked together either through a separate radio channel or a wired network 14. Each cell contains at most one coordinator and at least one access point, and each node within a cell is associated with at most one coordinator and at least one access point. The functionality of the coordinator and the access point may be combined in a single device 15. In addition, more than one node may be associated with a given AP. For example, two nodes 10 are associated with AP 13, as indicated by the dotted lines.

During the initial "power-up" of a node, the node must become acquainted with the network environment and establish connectivity in the network by becoming associated with an access point and a coordinator (if one exists). As discussed above, this process is referred to as the basic self-organization ("BSO") procedure.

The present invention implements a dual channel approach for implementing the BSO procedure. The first channel, referred to as the "control channel", is accessible by all nodes and relay points in the LAN. Another channel, the "data channel" is specific to every BSA, and is only accessible by relay points and nodes within the corresponding cell.

Using the dual channel approach, the only information stored at the node are the parameters allowing the node to communicate over the control channel common to all RPs. Once the node acquires operating parameters for the selected relay point over the control channel from the selected relay point, the node can establish communications with the selected relay point over the data channel, the data channel defined by the operating parameters.

The dual channel can be implemented in a variety of ways. For example, the data and control channels can be frequency division multiplexed. One frequency band may be set aside for the control channel that is common to all BSAs and other bands may be reserved for the data channels that are each unique to a particular BSA. Alternatively, the control and data channels can be time division multiplexed. Using this approach, predetermined time slots are set aside for control channel activities, while other time slots are reserved for data channel activities. As a third approach, the control and data channels may be implemented using non-interfering spreading codes in a spread spectrum system.

An added advantage gained by using the dual channel approach is that if the dual channels are achieved by other than time division multiplexing, then the activities on the control and data channels can take place concurrently, thus increasing the efficiency of the data channel. Moreover, the duty cycle of the control channel is expected to be much lighter than that of the data channel. Therefore, the system can be designed so that the capacity set aside for the control channel is smaller than that set aside for the data channel.

Figure 2:
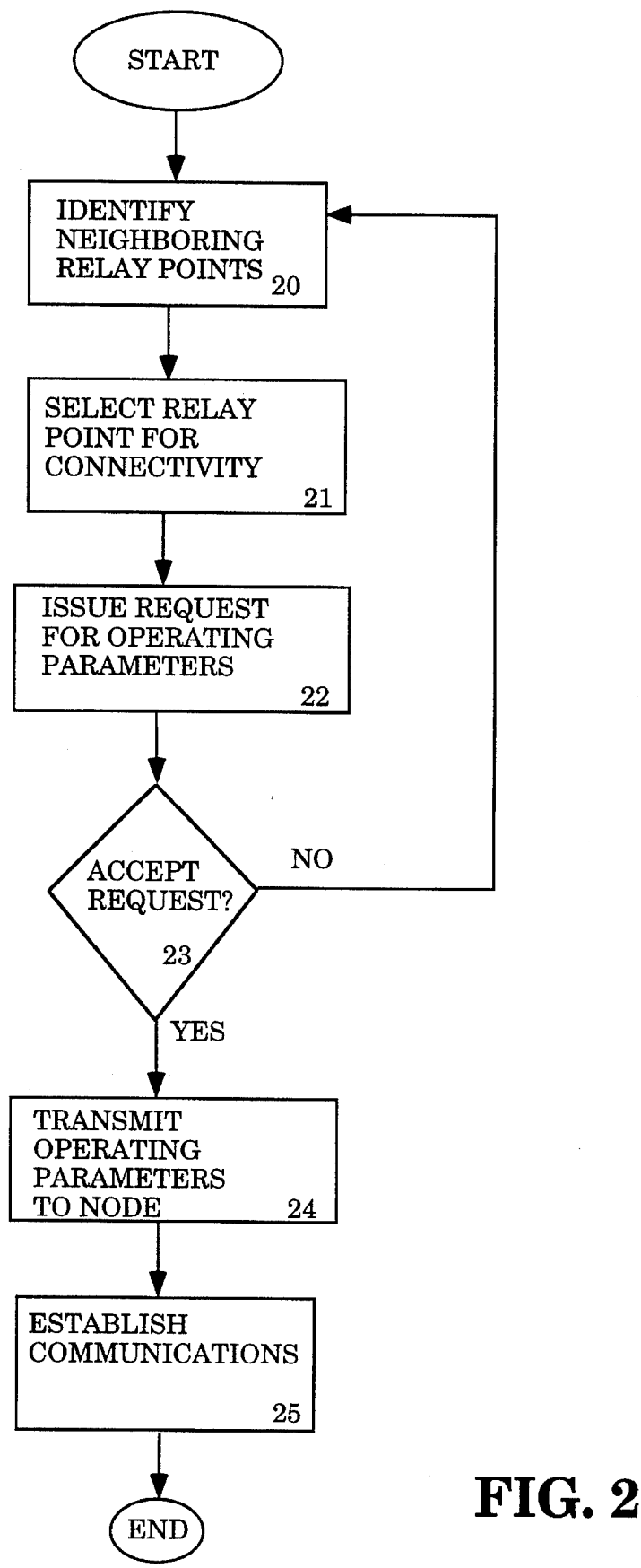
FIG. 2 is a flow chart illustrating the preferred method used to implement the present invention.

FIG. 2 is a flow chart representing an embodiment of the process of the present invention. To initiate the self-organization procedure, a node that has powered up will monitor the control channel and acquire information identifying the relay points in its geographic neighborhood, as shown in step 20. One way for the node to determine that a relay point is occupying the neighborhood of the node would be for the node to measure whether the quality of the signal received at the node from a particular relay point exceeds a predetermined threshold.

The control channel may operate in two modes to implement the acquisition of relay point identification information by a node: active and passive. If a LAN is configured to operate in the active mode, the node issues a request over the control channel requesting each relay point to transmit an identification message to the node over the control channel. If the LAN operates in the passive mode, each relay point transmits an identification message from time to time on the control channel, and the node polls the control channel for access to the identification message. The choice of which mode is used by the network is based on factors such as the sophistication of the equipment used for the nodes and relay points, and the expected system load.

Figure 3A:
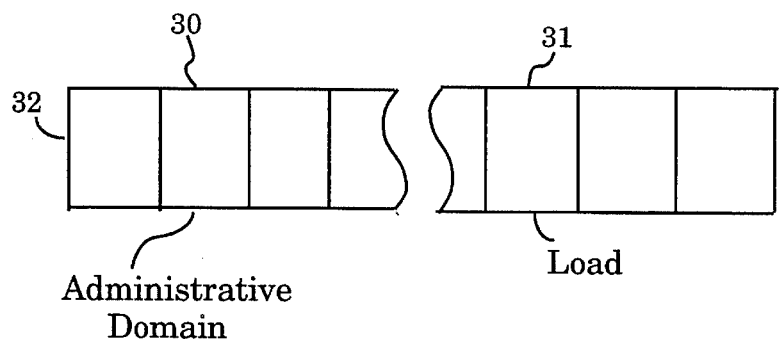
FIG. 3A illustrates the inclusion of identification information in a data packet transmitted by a relay point to a node.

The identification message transmitted by the relay point may convey information such as the administrative domain of the relay point, and the traffic load currently carried by the relay point. The administrative domain represents the particular authority which operates a given relay point. The traffic load is a value which reflects on the current throughput handled by the relay point. In a packet switching system, this information may, for example, occupy fields 30 and 31, respectively, of a data packet 32, as shown in FIG. 3A.

Once the node has identified its neighboring relay points, the node uses information obtained from the identification message to select the neighboring relay point with which the node wants to establish connectivity, as shown in step 21. The node preferably chooses the relay point that satisfies both performance-related and administrative criteria. For example, the node would most likely select the least loaded relay point among those belonging to the same administrative domain, which also has a signal quality that exceeds a given threshold. Note that unlike conventional systems, the present invention accommodates nodes belonging to different administrative domains.

The selection of the relay point by the node represents a significant advantage over prior art systems in which the node does not actively participate in the BSO process. In conventional systems, the relay points must determine, through communications among RPs, which RP will be connected to the node, using such criteria as which station receives the highest quality signal from the node. However, due to the asymmetric nature of radio links, the node itself can best determine the quality of the signal received at the node. By accounting for the signal reception at the node, the present invention achieves a substantial improvement in the quality of the node-relay point association. Moreover, the present invention requires no cooperation among the base stations in order to achieve self-organization.

Figure 3B:
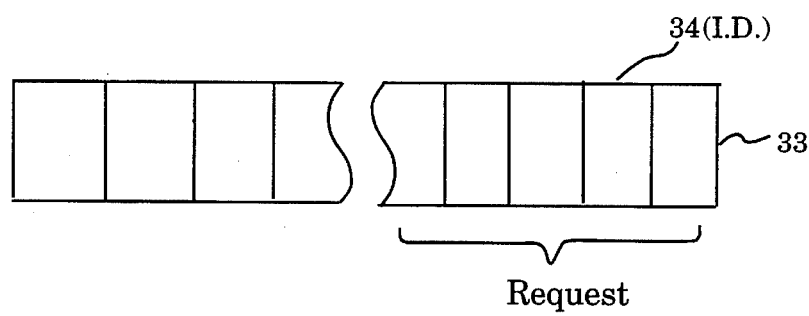
FIG. 3B illustrates a request for context parameters included in a data packet transmitted by the node to a selected relay point.

Once the node has selected a relay point with which to establish communications, the node issues a request over the control channel requesting that the selected relay point transfer the operating parameters to the node, step 22. The operating parameters of the node are adjusted to conform to the operating parameters of the RP to enable the node to establish communications with the selected relay point over a data channel, so that the node can communicate with other nodes in the same cell or to the network through the selected relay point, step 25. As shown in FIG. 3B, the request may occupy one or more fields in a data packet 33, and include information such as node identification information indicating whether the node is authorized to access a particular relay point, as represented in field 34.

In one embodiment, the relay point responds automatically to the node's request by transferring operating parameters to the node so that the node can adjust its own operating parameters to immediately establish communications with the RP over a data channel, step 24.

Alternatively, based on predetermined criteria, and using information obtained from the control channel or maintained by the relay point, or otherwise accessible to the relay point, the relay point determines whether to accept the node's request to establish connectivity, step 23. The criteria used by the relay point are preferably similar to the criteria used by the node to select the relay point. For example, the relay point may make a determination whether the load is light enough to accommodate communications with another node, whether the quality of the signal received from the node over the control channel is satisfactory, and/or whether the identification of the node included in the node's request indicates that it is authorized to communicate with the selected relay point.

Figure 3C:
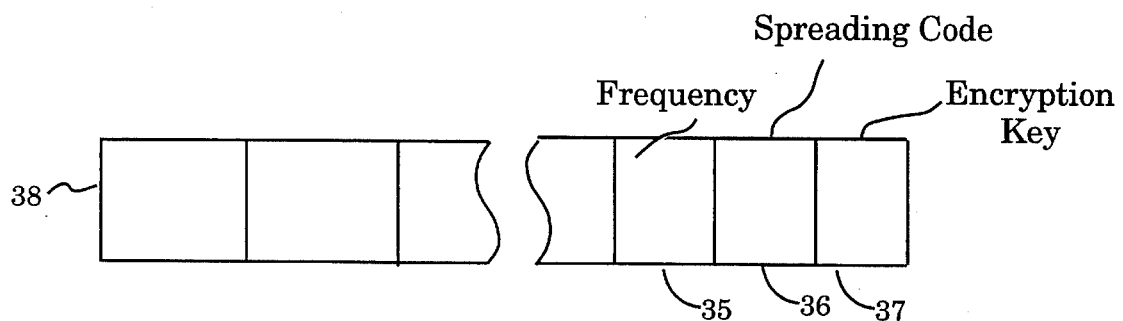
FIG. 3C illustrates context parameters included in a data packet transmitted by the selected relay point to the node.

If, at step 23, the relay point accepts the request of the node, the relay point will transmit its operating parameters over the control channel to the node, step 24. The operating parameters are the information needed by the node to establish communications with the relay point over the data channel, and typically include such parameters as the frequency of the data channel over which the relay point communicates, and spreading codes and encryption keys, as represented by fields 35, 36, and 37, respectively, of data packet 38 in FIG. 3C. Using the operating parameters received, the operating parameters of the node are adjusted so as to establish communications with the relay point, step 25.

If, at step 23, the relay point rejects the request of the node, the node repeats the self organization process, steps 20, 21, 22, 23, to select a different relay point with which to establish communications.

Figure 4:
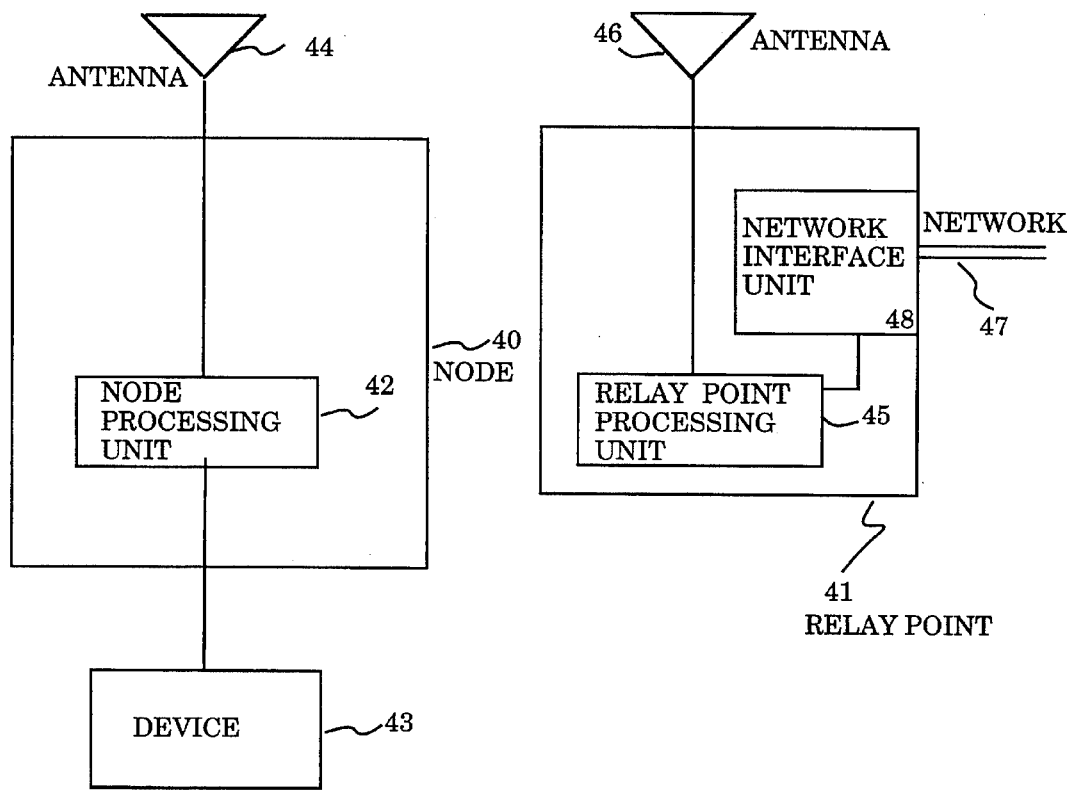
FIG. 4 is a simplified block diagram of an apparatus implementing the present invention.

FIG. 4 is a simplified block diagram of a node 40 and a relay point 41, which are used to implement an embodiment of the present invention. Note that although the combination of functions featured in the invention is novel and unique, the construction of an apparatus to implement each of these functions individually is well known to one skilled in the art given the teachings provided herein.

In one embodiment of the invention, each node 40 comprises a node processing unit 42, which communicates with a device 43 and is connected to antenna 44 to permit communication between the node and the relay point 41. The device 43 represents any apparatus that occupies a node, e.g., a computer, a peripheral device or communications hardware.

The relay point 41 includes a relay point processing unit 45, which is linked to antenna 46 to allow the relay point 41 to communicate with the node 40 through node processing unit 42. If the relay point 41 includes an AP, then relay point 41 further includes a network interface 48, linking the relay point to other APs in the network 47.

Thus, when the device 43 indicates that communications are to be established with other nodes in the same cell through RP 41 acting as a coordinator, or with the network 47 through RP 41 acting as an access point, then the node processing unit 42, using the parameters for the control channel, communicates a request, via antenna 44, to the antennae 46 of the relay points 41 for identification. The relay point processing unit 45, for each relay point communicates identification information, via antenna 46, over the control channel to the node 40. The node processing unit 42 determines the relay point 41 to select and issues a message over the control channel to the selected relay point to request the operating parameters for the relay point 41. The relay point processing unit 45 receives the request and issues a response over the control channel to the node 40. If relay processing unit 45 determines to accept the request, it transmits the operating parameters for the relay point 41 to the node 40. The node processing unit 42 conforms the node 40 to the operating parameters received and communications are established between the node 40 and relay point 41, and therefore with other nodes in the same cell or with the network 47, over the data channel.

Although the invention has been described in conjunction with preferred embodiments, it will be appreciated that various modifications and alterations might be made by those skilled in the art without departing from the spirit and scope of the invention.

What is claimed is:

1. In a wireless local area network (LAN) comprising a plurality of cells, each cell comprising at least one node and at least one relay point for communicating information between nodes wherein the nodes and relay points in the local area network are not necessarily uniform and distributed, specifically wherein at least one node operates differently from the other nodes and at least one relay point operates differently from the other relay points of the local area network, a method for the node to implement self-organization comprising the steps of:

a first node communicating with the relay points over a common control channel to acquire identification information from the relay points of the local area network, wherein the first node resides in at least a first cell and the relay points reside in at least the first cell;

the first node selecting one of the identified relay points for communication with the first node;

the first node issuing a request over said control channel requesting that the selected relay point transfer operating parameters of the selected relay point to the first node;

the selected relay point transferring the operating parameters over said control channel to the first node; and conforming the first node to the operating parameters of the selected relay point such that the first node is prepared to communicate with the selected relay point.

2. The method as set forth in claim 1, further comprising the step of said selected relay point determining whether to accept or reject said request from the first node.

3. The method as set forth in claim 2, further comprising the step of repeating said communicating, selecting, issuing, transferring, and conforming steps if said selected relay point determines to reject said request.

4. The method as set forth in claim 1, wherein the first node communicates with the selected relay point on a data channel, unique to the cell corresponding to the selected relay point.

5. The method as set forth in claim 1, wherein said step of communicating further comprises the steps of:

issuing a message from the first node over said control channel requesting that each relay point transmit identification information to said first node over said control channel; and transmitting said identification information from the relay points to the first node over said control channel.

6. The method as set forth in claim 1, wherein each of the relay points intermittently transmits identification information over the control channel, said first node polling the control channel for identification information for each relay point.

7. The method as set forth in claim 1, wherein said selecting step further comprises the step of determining that a relay point satisfies performance-related criteria.

8. The method as set forth in claim 1, wherein said selecting step further comprises the step of determining that a relay point satisfies administrative criteria.

9. The method as set forth in claim 1, wherein said identification information comprises performance-related information concerning each said relay point.

10. The method as set forth in claim 1, wherein said identification information comprises administrative information concerning each said relay point.

11. In a wireless local area network comprising a plurality of cells, each cell comprising at least one node and at least one relay point for communicating information between nodes wherein the nodes and relay points in the local area network are not necessarily uniform and distributed, specifically wherein at least one node operates differently from the other nodes and at least one relay point operates differently from the other relay points of the local area network, a method for the node to implement self-organization comprising the steps of:

a first node communicating a message over said control channel requesting that each relay point transmit identification information to the node over said control channel;

each relay point transmitting identification information to the first node over said control channel;

the first node selecting one of the identified relay points for communication with the first node;

the first node issuing a request over said control channel requesting that the selected relay point transfer operating parameters of the selected relay point to the first node;

the selected relay point determining whether to accept or reject the request;

if the selected relay point determines to accept the request:

the selected relay point transferring the operating parameters over said control channel to the first node;

conforming the first node to the operating parameters of the selected relay point, such that the first node is prepared to communicate with the selected relay point;

the first node communicating with the selected relay point on a data channel unique to the cell corresponding to the selected relay point; and if the selected relay point determines to reject the request, repeating said communicating, transmitting, selecting, issuing, and determining steps.

12. In a wireless local area network (LAN) comprising a plurality of cells, each cell comprising at least one node and at least one relay point for communicating information between said nodes wherein the nodes and relay points in the local area network are not necessarily uniform and distributed, specifically wherein at least one node operates differently from the other nodes and at least one relay point operates differently from the other relay points of the local area network, an apparatus for the node to implement self-organization comprising:

(a) a common control channel over which said nodes and said relay points communicate information, wherein said common control channel is common to said plurality of cells;

(b) at least one data channel, unique to each of said cells, over which a node and a relay point communicate information;

(c) each node comprising:

(i) identification means for identifying relay points by acquiring identification information transmitted by said relay points across said common control channel, wherein said relay points reside in at least the same cell as said each node;

(ii) selection means for selecting one of said relay points for communication with said node;

(iii) first requesting means for issuing a message over said control channel requesting that said selected relay point transfer operating parameters of the selected relay point from said relay point to said node; and (iv) conforming means for conforming the node to the operating parameters received from the selected relay point; and (d) each relay point comprising transfer means for transferring said operating parameters over said control channel from said selected relay point to said node.

13. The apparatus as set forth in claim 12, wherein said relay point further comprises determining means for determining whether said relay point will accept or reject said request.

14. The apparatus as set forth in claim 13, wherein said node further comprises a control means for controlling said identification means, selection means and first requesting means to execute if the selected relay point determines to reject the request of the node for the operating parameters of the relay point such that an alternate relay point is selected.

15. The apparatus as set forth in claim 12, each node further comprising node communications means for communicating with a relay point over a data channel indicated by the operating parameters transferred by the relay point, and each relay point further comprising relay point communication means for communicating with a node over the data channel in accordance with the operating parameters of the relay point.

16. The apparatus as set forth in claim 12, wherein said identification means further comprises a second requesting means for issuing a message over the control channel requesting that each relay point transmit identification information to the node over said control channel.

17. The apparatus as set forth in claim 12, wherein each relay point further comprises means for intermittently transmitting identification information from said relay point over said control channel; and said identification means further comprises polling means for polling the control channel for the identification information from said relay point.

18. The apparatus as set forth in claim 12, wherein said selection means further comprises means for determining that a relay point satisfies performance-related criteria.

19. The apparatus as set forth in claim 12, wherein said selection means further comprises means for determining that a relay point satisfies administrative criteria.

20. The method as set forth in claim 12, wherein said identification information comprises performance-related information concerning each said relay point.

21. The method as set forth in claim 12, wherein said identification information comprises administrative information concerning each said relay point.

* * * * *